April 7, 1959     H. J. TROCHE     2,881,030
PLATFORM LEVELING APPARATUS
Filed Sept. 4, 1956     2 Sheets-Sheet 2
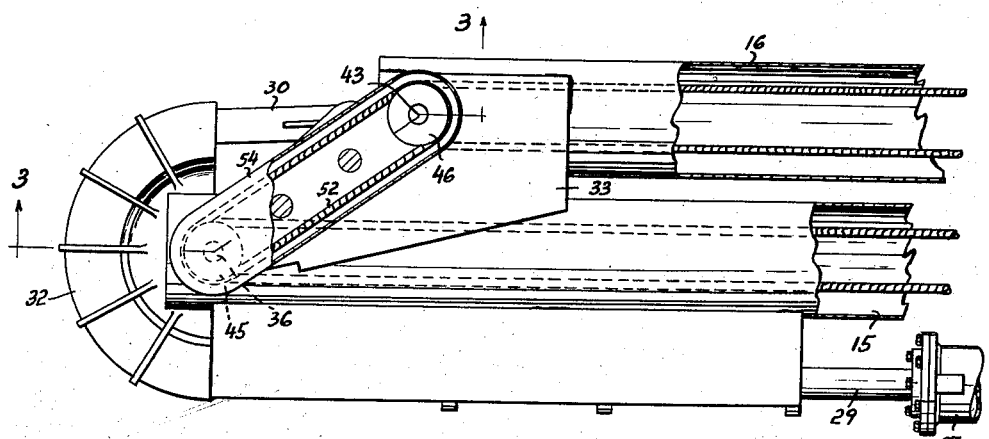
Fig.-2
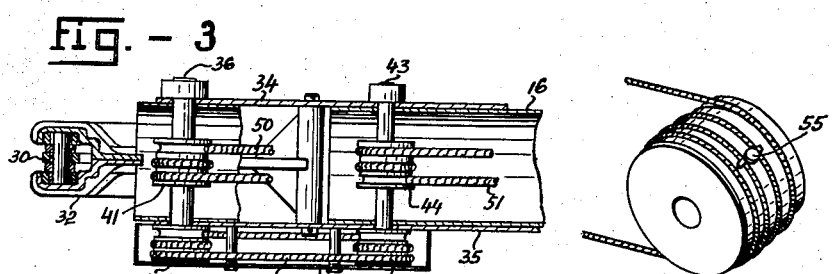
Fig.-3
Fig.-6
Fig.-4
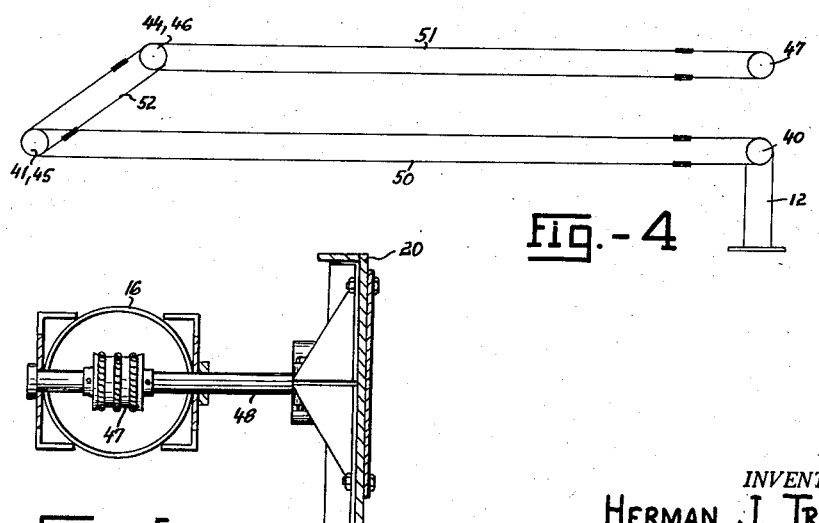
Fig.-5
INVENTOR.
HERMAN J. TROCHE
BY Bates, Teare & McBean
ATTORNEYS

United States Patent Office 2,881,030
Patented Apr. 7, 1959

2,881,030

PLATFORM LEVELING APPARATUS

Herman J. Troche, Fairview Park, Ohio, assignor to J. H. Holan Corporation, Cleveland, Ohio, a corporation of Ohio Application September 4, 1956, Serial No. 607,688

9 Claims. (Cl. 304—29)

This invention relates generally to a mobile aerial tower having a plurality of articulated tower sections carrying a work platform at one extremity to provide access to overhead traffic lights, street lamps, and similar objects for installation, maintenance and repair. The invention is more particularly directed to the provision of an improved arrangement for maintaining the work platform level for all positions of the tower throughout its operating range.

In a mobile aerial tower that can be selectively positioned to various angular and extended positions it is essential that some provision be made to maintain the work platform level at all times. The leveling arrangement can be automatically responsive to the movement of the tower whereby the operator need only concern himself with controlling the tower movements.

Accordingly, it is a principal object of this invention to provide in a mobile aerial tower an improved arrangement for automatically maintaining a work platform level in response to tower movements throughout the operating range of the tower.

Another object of the invention relates to the provision in a mobile aerial tower of an improved and simplified arrangement for maintaining a work platform level with a minimum of maintenance and repair.

Another object of this invention relates to the provision of an improved arrangement which co-operates in a simplified manner with an articulated connection between relatively movable tower sections to automatically maintain a work platform carried by one of the tower sections level for every position of the tower throughout its operating range.

Another object of this invention relates to the provision of an improved arrangement which co-operates in a simplified manner with an articulated connection between relatively movable tower sections to automatically maintain a work platform carried by one of the tower sections level for every position of the tower throughout its operating range.

Briefly, the foregoing and other objectives which will become more apparent with the more detailed description which follows are accomplished by pivotally coupling a pair of tower sections together in end to end relation through an articulated connection which permits relative movement between the sections on a supporting mast. One of the tower sections pivotally supports a work platform in cantilever fashion at its extremity and a system of interconnected drums and cables coact between the mast, the articulated connection and the work platform to automatically maintain the platform level at all times in response to the relative positions of the tower sections to each other and to the mast throughout their operating range.

In the drawings:

Fig. 2 is an enlarged view of the articulated connection between the tower sections with portions thereof broken away to illustrate the disposition of platform leveling drums and cables;

Fig. 3 is a partial sectional view taken along the dotted lines 3—3 in Fig. 2 of the drawings;

Fig. 4 is a diagrammatic representation of the drum and cable system for maintaining the work platform level;

Fig. 5 is a partial sectional view through the free extremity of the upper tower section and the work platform illustrating the cantilever support for the platform;

Fig. 6 is a perspective view diagrammatically illustrating the disposition and anchorage of the cables on the drums.

Figure 1:
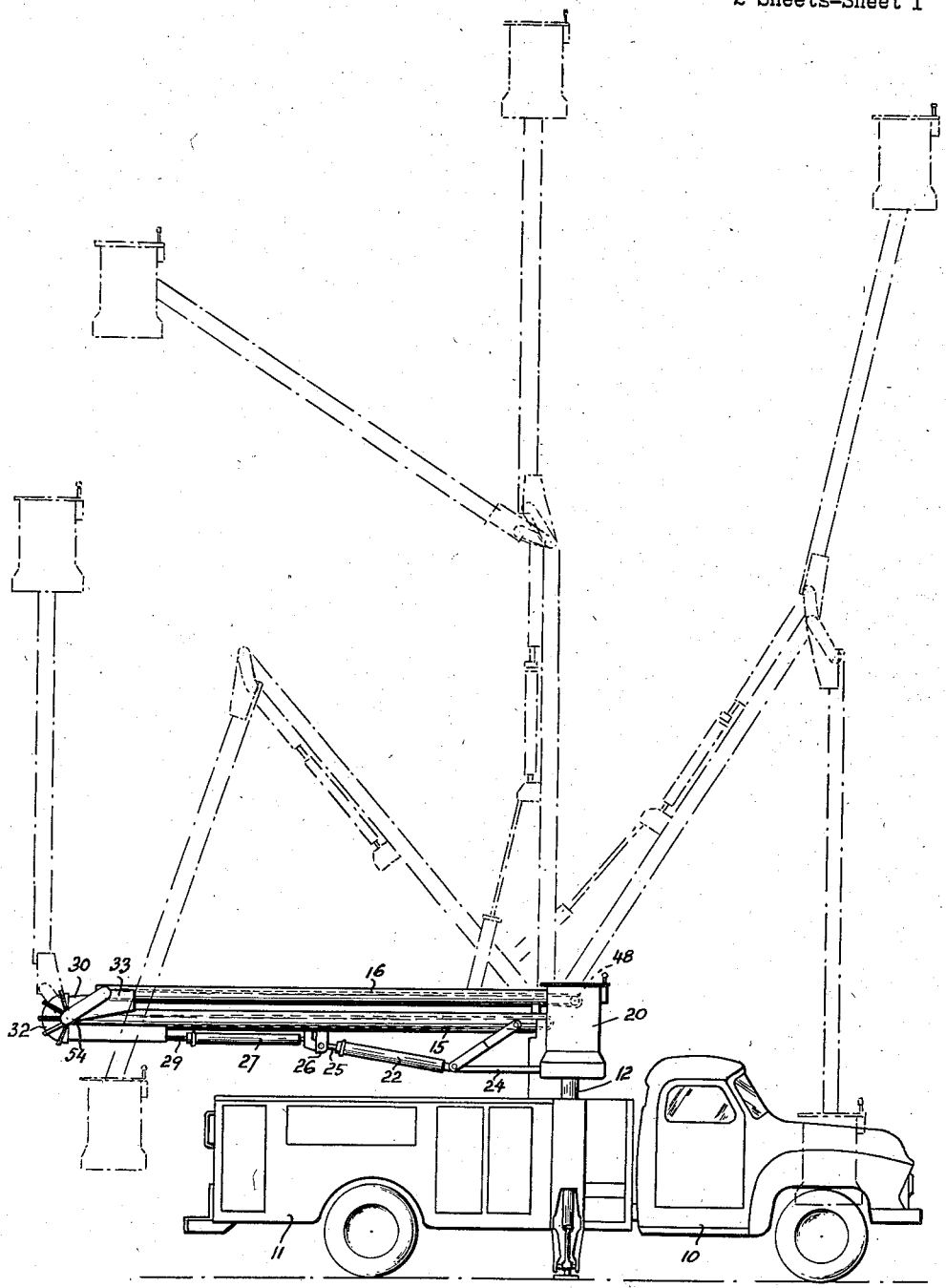
Fig. 1 is a side elevation of a utility vehicle carrying the mobile aerial tower and illustrating in dotted lines the various positions of the tower and work platform relative to the supporting mast.

Referring now more particularly to Fig. 1 of the drawings, there is shown a wheeled utility vehicle 10 having a truck body 11 which supports a vertical mast 12. The upper portion of the mast may be rotatable and supports a collapsible tower which includes a pair of tubular tower sections 15 and 16 pivotally interconnected in end-to-end relation. The upper tower section 16 carries a work platform 20 at its outer extremity and the lower tower section 15 is pivotally connected to the rotatable mast 12 for tilting movement in a vertical plane. The work platform 20 is in the form of an enclosed box-like structure which is preferably swingably supported in cantilever fashion on the free extremity of the upper tower section 16 (Fig. 5) in such manner that as the tower sections are tilted in a vertical plane the work platform can be maintained level for any tilted position.

The lower tower section 15 is tilted by means of a fluid actuated piston motor 22 which has one end anchored to a bracket 24 carried by the mast 12 and a piston rod 25 pivotally connected at its extremity to a bracket 26 mounted intermediate the ends of the lower tower section 15. The upper tower section 16 is independently tiltable relative to the lower tower section 15 by means of a fluid actuated piston motor 27 which has one end pivotally connected to the bracket 26 and a piston rod 29 connected to a flexible strap 30 which extends about an arcuate guide 32 carried by the pivoted extremity of the lower tower section. The other end of the strap 30 is connected to a saddle member 33 which coacts therewith to provide an articulated connection between the tower sections in a manner to be hereinafter more fully described.

The saddle member 33 partially surrounds and acts as a seat for the pivoted end of the tower section 16 and is welded or otherwise secured thereto. The saddle member includes extended side plates 34 and 35 which are pivotally coupled for rotation on a pivot shaft 36 extending transversely through the pivoted extremity of the lower tower section 15. Thus, when the piston rod 29 is reciprocated in response to selective application of fluid under pressure, the flexible strap 30 will travel with the piston rod 29 along the arcuate guide 32 to tilt the saddle member 33 and thereby raise or lower the upper tower section 16 depending upon the direction of reciprocation of the piston rod.

As best shown in the dotted lines in Fig. 1 of the drawings, the upper and lower tower sections may be independently positioned relative to each other and to the supporting mast 12 to position the platform 20 at various angles and various extended positions. Since the object of the aerial tower is to present a workman to normally inaccessible street lamps or the like, it will be recognized that it is necessary to maintain the work platform level for all positions of the tower. Reference is made to Fig. 4 in conjunction with Figs. 2, 3 and 5 wherein a drum and cable system is shown for interconnecting the work platform 20 through the articulated connection to the mast 12 in a manner that will automatically maintain the work platform level throughout the operating range of the tower.

The system includes a first drum 40 fixed on the mast 12 and a second drum 41 keyed on the pivot shaft 36 which is rotatably journalled in the pivoted extremity of the lower tower section 15. A second shaft 43 is rotatably journalled in the pivoted extremity of the upper tower section 16 and carries a third drum 44 which is keyed on the shaft. A pair of drums 45 and 46 are keyed respectively on an extremity of the shafts 36 and 43 external to the saddle side plate 35. Another drum 47 is keyed on the shaft 48 which is rotatably journalled in the free extremity of the upper tower section 16 and which supports the work platform 20 in cantilever fashion on an extended extremity as best shown in Fig. 5 so that the platform rotates with the shaft 48. A suitable cable or wire rope 50 interconnects the fixed drum 40 with the drum 41 and another cable 51 interconnects the drum 44 with the platform drum 47. The pair of drums 45 and 46 are likewise interconnected by a cable 52 and this portion of the system is enclosed by a cover 54. The cables are connected to the corresponding drums by connectors 55 as best shown in Fig. 6 to insure against slippage.

In operation, when the fluid motor 22 is actuated to tilt the lower tower section 15 clockwise, the cable 50 coacts with the fixed drums 40 to maintain drums 41 and 45 fixed relative to the mast 12. The cables 52 and 51 coact in similar fashion to maintain the drum 44, 46 and the drum 47 fixed relative to the mast 12 to maintain the platform level. In like fashion, when the fluid motor 27 is actuated to tilt the upper tower section 16 counter clockwise relative to the lower tower section 15, the drum 44 is maintained fixed by the cables 50 and 52 which are connected to the fixed drum 40 and the cable 51 coacts with the platform drum 47 to maintain the work platform 20 level. It will be readily apparent that reverse movement of the tower sections will cause a corresponding corrective leveling of the work platform and that combined movement of the tower sections will result in a combined corrective leveling of the platform so that the platform is maintained level throughout the tower operating range.

Thus, there has been provided a mobile aerial tower having a pair of articulated tower sections carrying a work platform at their outer extremity and having a system of drums and cables for maintaining the platform level throughout the operating range of the tower. The drum and cable system is simple and economical in construction and co-operates the articulated connection between the tower sections to automatically perform its platform leveling function in response to controlled movement of the tower sections. The simplified construction of the platform leveling system requires a minimum of maintenance and service and yet, provides optimum platform leveling performance without the intervention of an operator throughout the operating range of the tower.

I have shown and described what I consider to be the preferred embodiments of my invention along with suggested modified forms, and it will be obvious to those skilled in the art that other changes and modifications can be made without departing from the scope of my invention as defined by the appended claims.

I claim:

1. In an aerial tower having a first tower section and a second tower section pivotally interconnected in substantially end to end relation and with the tower pivotally coupled at its lower end to a mast for relative tilting movement in a vertical plane, the combination therewith of, a level platform pivotally supported for swinging movement in a vertical plane on the upper end of the tower, a fixed drum mounted on the mast on an axis transverse to the tilting plane of the tower, a second drum journaled for rotation on the pivotal axis between the tower sections, a third drum journaled for rotation on the pivoted end of the second tower section in spaced relation from the pivotal connection between the tower sections, another drum journaled for rotation on the second tower section in lengthwise spaced relation to said third drum, said other drum being operatively connected to said platform for causing swinging movement of said platform in response to rotation of said last mentioned drum, and flexible means interconnecting said drums with respect to one another and coacting therewith in response to tilting movement of the tower sections relative to one another and to the mast, to cause rotation of said second, third and other drum and thereby maintain the platform level for any tilted position of the tower sections throughout the operating range of the tower.

2. The apparatus of claim 1 wherein said fixed drum is mounted on an axis coincident with the pivot axis of the lower end of the tower on the mast and wherein said other drum is mounted coincident with the pivot axis of the platform on the upper end of the tower.

3. The apparatus of claim 1 wherein the upper end of the tower rotatably supports a shaft disposed transverse to the tilting plane and having an extended extremity and wherein said platform is secured on the extended extremity of said shaft in cantilever fashion at one side of said tower, and wherein said other drum is keyed on said shaft for rotation therewith.

4. The apparatus of claim 1 wherein a shaft is journaled for rotation in the pivoted end of the second tower section in spaced relation from the pivotal connection between the tower sections and wherein said third drum is keyed on said shaft for rotation therewith, and wherein said flexible means respectively interconnects said fixed drum with said second drum, and said second drum with said third drum, and said third drum with said other drum.

5. The apparatus of claim 4 wherein said flexible means includes a first cable extending about and anchored to the fixed drum and the second drum, a second cable extending about and anchored to the second and third drums, and a third cable extending about and anchored to the third drum and said other drum.

6. A mobile aerial tower comprising in combination, a base, a tower section having one end pivotally mounted on the base for tilting movement in a vertical plane, a second tower section having one end pivotally coupled to the other end of the first tower section for relative tilting movement in a vertical plane, tilting means selectively coacting between the base and the first tower section, other tilting means independently coacting between the first and second tower sections, a work platform pivotally supported for swinging movement in a vertical plane on the other end of the second tower section, a fixed drum mounted on the base to provide a capstan thereon, a second drum journaled for rotation on the pivot axis between the tower sections, a third drum journaled for rotation on said second tower section in generally vertically spaced relation to said second drum, and another drum mounted for rotation coincident with the swinging movement of the work platform, flexible means extending about the fixed drum and the second drum and about the second drum and the third drum and about the third drum and the platform drum respectively and adapted to coact therewith in response to tilting movement of the tower sections to rotate said second, third and platform drums and thus maintain the work platform level for any tilted positions of the tower sections throughout their operating range.

7. The aerial tower of claim 6 wherein the pivotal coupling between the tower sections includes a pivot shaft rotatably journaled in the other end of the first tower section and a saddle member carried by said one end of the second tower section having outwardly and downwardly projecting extremities journaled on said pivot shaft and supporting the second tower section in surmounting relation above the lower section, a second shaft rotatably journaled in said one end of the second tower section in spaced relation from the pivot shaft, and wherein said second drum is fixed on said pivot shaft, and said third drum is fixed on said second shaft, and wherein said flexible means extends about the fixed drum and the second drum and thence about the third drum and the platform drum respectively.

8. The apparatus of claim 7 wherein each tower section is an elongated tubular member and wherein the second, the third and platform drums are each journaled on their respective axes within the confines of said tubular tower sections and wherein the flexible means includes a cable extending through the tower sections.

9. A mobile aerial tower comprising in combination a base, a tower section having one end pivotally mounted on the base for tilting movement in a vertical plane, a second tower section having one end pivotally coupled to the other end of the first tower section for relative tilting movement in a vertical plane, said pivotal coupling between the tower sections including a pivot shaft rotatably journaled in the other end of the first tower section and a saddle member carried by said one end of the second tower section and having outwardly and downwardly projecting extremities journaled on said pivot shaft and supporting the second tower section in surmounting relation above the first mentioned tower section, tilting means selectively coacting between the base and the first tower section, other tilting means independently coacting between the first and second tower sections, a level work platform pivotally supported for movement in a vertical plane on the other end of the second tower section, a fixed drum mounted on the base on an axis transverse to the tilting plane of the tower, a second drum secured to said pivot shaft for rotation therewith, a second shaft rotatively journaled in said one end of the second tower section and in spaced relation from said pivot shaft, a third drum fixed on said second shaft, and a fourth drum journaled for rotation on said second tower section, said fourth drum being operatively connected to said platform for causing swinging movement of said platform in response to rotation of said last mentioned drum, said pivot shaft and said second shaft each carrying an additional drum spaced axially from said second and third drums respectively, and flexible means extending about the drums and interconnecting the latter with respect to one another, said flexible means including a cable independently extending about the fixed and second drum, another cable independently extending about the additional drums, and a third cable independently extending about said third and fourth drums, said cables coacting with the respective drums in response to the tilting movement of the tower sections to rotate said second, additional, third and fourth drums and maintain the work platform level for any tilted positions of the tower sections, throughout their operative range.

References Cited in the file of this patent
UNITED STATES PATENTS

| | | |
|---|---|---|
| 2,450,152 | Milter | Sept. 28, 1948 |
| 2,616,768 | Stemm | Nov. 4, 1952 |
| 2,674,500 | Hukari | Apr. 6, 1954 |
| 2,682,432 | Schmidt | June 29, 1954 |